United States Patent [19]
Allen et al.

[11] Patent Number: 5,445,006
[45] Date of Patent: * Aug. 29, 1995

[54] SELF-TESTABLE MICRO-ACCELEROMETER AND METHOD

[75] Inventors: Henry V. Allen, Fremont; Stephen C. Terry, Palo Alto; Diederik W. De Bruin, Santa Clara, all of Calif.

[73] Assignee: IC Sensors, Inc., Milpitas, Calif.

[*] Notice: The portion of the term of this patent subsequent to Apr. 14, 2009 has been disclaimed.

[21] Appl. No.: 138,349

[22] Filed: Oct. 18, 1993

Related U.S. Application Data

[60] Division of Ser. No. 915,792, Jul. 17, 1992, Pat. No. 5,253,510, which is a continuation of Ser. No. 668,180, Mar. 12, 1991, abandoned, which is a division of Ser. No. 370,364, Jun. 22, 1989, Pat. No. 5,103,667.

[51] Int. Cl.$^6$ .............................................. G01P 21/02
[52] U.S. Cl. ........................................................ 73/1 D
[58] Field of Search ............. 73/1 D, 1 DV, 2, 517 R

[56] References Cited

U.S. PATENT DOCUMENTS

| | | | |
|---|---|---|---|
| 2,923,904 | 2/1960 | Hieber | 73/1 D |
| 4,653,326 | 3/1987 | Danel et al. | 73/517 R |
| 4,750,364 | 6/1988 | Kawamura et al. | 73/517 R |
| 5,103,667 | 4/1992 | Allen et al. | 73/1 D |
| 5,253,510 | 10/1993 | Allen et al. | 73/1 D |

OTHER PUBLICATIONS

Pasricha et al., "Design, Construction and Calibration of an Accelerometer", J. Technol vol. 12, No. 2, Dec. 1967.

Bouche, "Accurate Accelerometers Calibrations by Absolute and Comparison Methods", Endevco Tech Data, TPC 233, 1966.

Johansson, "Accelerometer Calibration", Instruments & Control Systems, pp. 79–81, Dec. 1963.

*Primary Examiner*—Robert Raevis
*Attorney, Agent, or Firm*—Fitch, Even, Tabin & Flannery

[57] ABSTRACT

An apparatus and method of operation for a self-testable accelerometer having a housing, a diaphragm for detecting movement in response to an applied force, a mass on the diaphragm, at least one capacitive plate attached to the housing and disposed such that a potential difference between the capacitive plate and the mass causes a movement of the mass, means for producing a potential difference between the mass and the capacitive plate, and at least one piezoresistive element attached to the housing and the diaphragm for sensing movement of the mass. The accelerometer's housing comprises a frame, a base and a cap with air gaps providing squeeze film damping and mechanical stops for inhibiting movements of the mass. The combination of the capability to electrostatically produce a movement of the mass and the piezoresistive sensing of that movement allows testing and calibration of the accelerometer at any stage in its manufacture or deployment without the need for external equipment such as shakers.

10 Claims, 3 Drawing Sheets

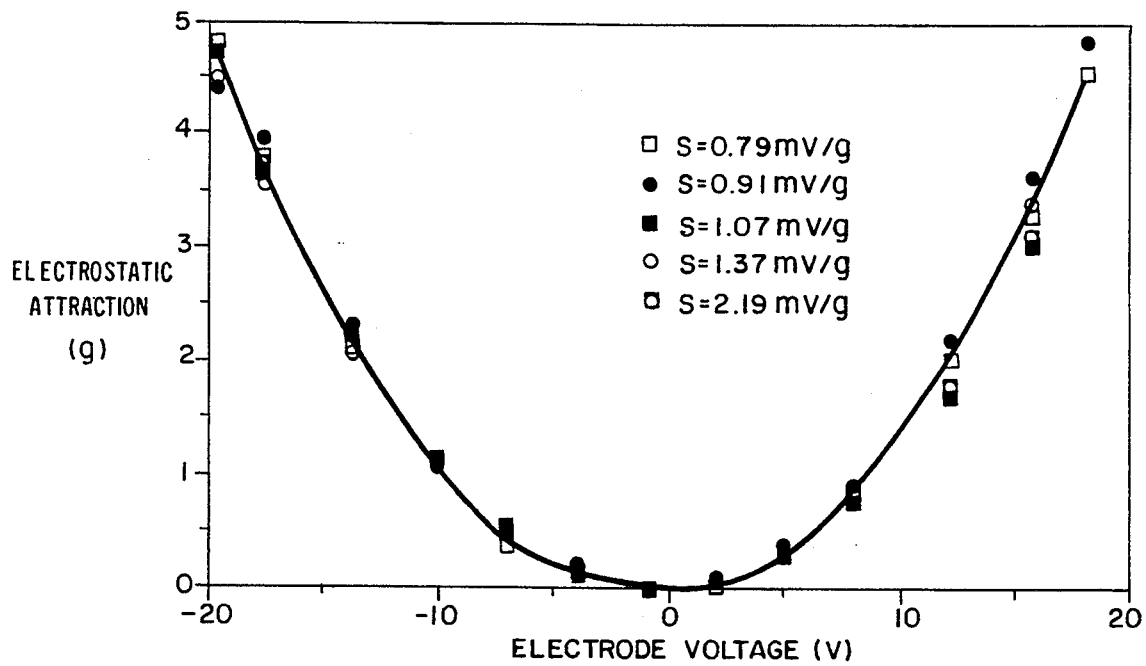
FIG. 4  ELECTROSTATIC ATTRACTION VS. ELECTRODE VOLTAGE FOR DIFFERENT SENSITIVITIES.
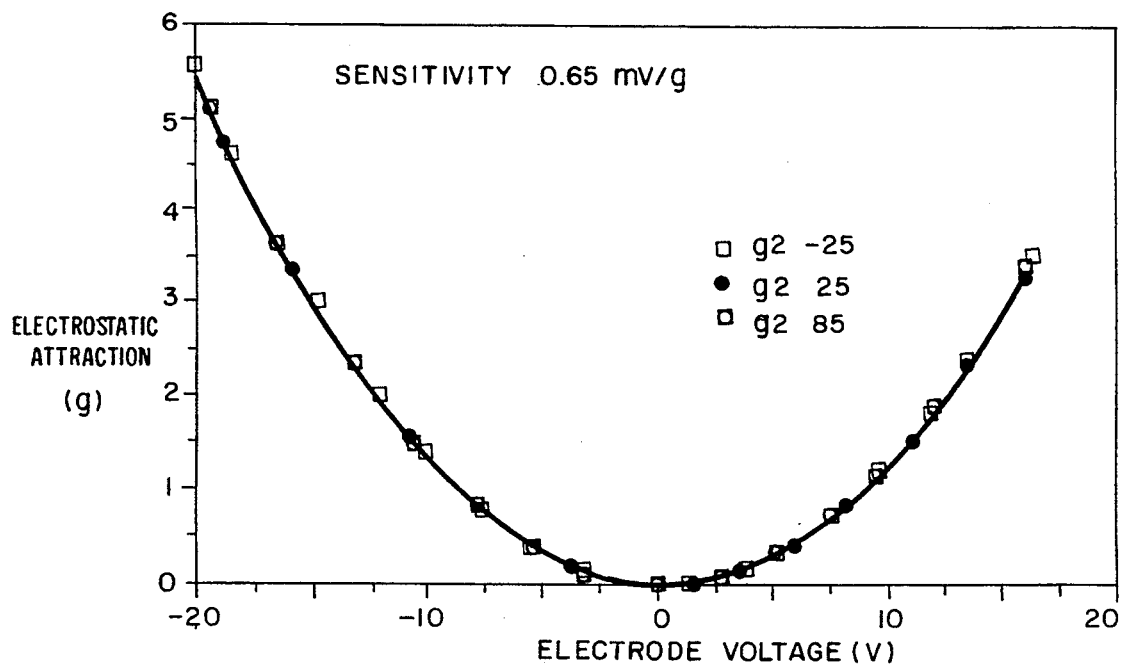
FIG. 5  ELECTROSTATIC ATTRACTION VS. ELECTRODE VOLTAGE AT DIFFERENT TEMPERATURES.

SELF-TESTABLE MICRO-ACCELEROMETER AND METHOD

This is a division of application Ser. No. 07/915,792, filed Jul. 17, 1992, now U.S. Pat. No. 5,253,510, which is a continuation of application Ser. No. 07/668,180, filed Mar. 12, 1991(now abandoned) which is a division of application Ser. No. 07/370,364, filed Jun. 22, 1989, now U.S. Pat. No. 5,103,667

FIELD OF THE INVENTION

The present invention relates generally to the field of micromachinable accelerometers and more particularly to a micromachinable accelerometer utilizing piezoresistive elements and having the capability of self-testing and self-calibrating.

BACKGROUND OF THE INVENTION

Accelerometers are used in a wide range of applications such as inertial navigation systems, safe-and-arming weapons, geophysical exploration, and automotive crash sensing. The efficacy of devices utilizing accelerometers can be greatly enhanced by miniaturization. Thus, silicon micromachined accelerometers have been developed beginning with a single cantilever structure with a silicon mass and piezoresistive sensor as described in Roylance, L. M., and J. B. Angell, "A batch-fabricated silicon accelerometer", IEEE Transactions on Electron Devices, Vol. ED-26, No. 12, 1979, p. 1911.

In another method to measure the acceleration detected by an accelerometer, as disclosed in U.S. Pat. No. 4,711,128 to Boura, a pendulum type mass with capacitive plates is suspended between two fixed capacitive plates. The mass is kept in a neutral position by electrostatically balancing the forces on the mass. The required electrostatic return force to maintain the balance is monitored to provide a measure of the detected acceleration. Variations of this method of using capacitors to produce electrostatic return forces are disclosed in U.S. Pat. Nos. 4,393,710 to Bernard and 4,566,328 to Bernard et al.

A problem which arises for all accelerometers used in applications which require ultra-high reliability, such as safe-and-arming and automobile air-bag devices, is to determine whether the accelerometer is functioning and functioning accurately. Often it is imperative that failure of accelerometer-based sensors be known as quickly as possible. For instance, in geophysical exploration applications, large numbers of sensors are chained together and any drop-outs in the array due to non-functional sensors would produce inaccurate results and/or degrade resolution. Further, in inertial guidance systems and geophysical applications, the operating environment can be extremely hostile, resulting in high failure rates. In other applications, such as fusing projectiles and air-bags, it is critical to determine sensor defects which may cause unexpected detonation or failure to detonate when required.

In the prior art, piezoresistive sensors have required that testing and calibration be done using an external forcing function. Typically, an external force is applied and the results are noted for testing and measured to provide a calibrated output. This approach has the disadvantage that the sensor must be subjected to the same forcing function for calibration that it is being used to measure. In many cases, this is very difficult to achieve. For example, sensors used in geophysical applications must accurately detect a wide range of possible forces. For accelerometers, this prior art approach to testing and calibration has the further serious disadvantage of requiring each accelerometer to be individually tested on a shaker or similar mechanical device. Further, shakers have been known to produce significant errors when the accelerometer under test is not directly in the main shaker axis.

There are in the prior art other self-testing concepts which have been proposed for use in sensors such as utilizing an integrated current loop for Hall effect magnetosensors which provide calibration through a fixed coupling. There have also been proposed precision capacitive structures for calibration. Implementing these concepts, however, requires complicated and highly precise mechanical and electronic structures with attendant manufacturing complexity and higher costs. Almost all accelerometers currently in the planning or production stage do not possess any self-testing functionality whatsoever.

SUMMARY OF THE INVENTION

Accordingly, it is a principal object of the present invention to provide an accelerometer having the capability to test and calibrate itself.

It is a further object of the present invention to provide an accelerometer which can be tested at the wafer level of production.

It is yet a further object of the present invention to provide an accelerometer which can be tested in situ at deployment.

It is another object of the present invention to provide a micromachined accelerometer having high reliability and accuracy.

It is yet another object of the present invention to provide an accelerometer which produces acceleration measurements which are device-insensitive over wide ranges of device sensitivity and temperature variation.

It is still another object of the present invention to provide an accelerometer system with ratiometric sensitivity compensation.

Accordingly, to achieve these and other objects, the present invention comprises an apparatus and method of operation of same, the apparatus being a self-testable accelerometer having a housing, a diaphragm, including a mass, mounted in the housing for movement with respect to the housing in response to an applied force, at least one capacitive plate attached to the housing and disposed such that a potential difference between the capacitive plate and the mass causes a movement of the mass, means for producing a potential difference between the mass and the capacitive plate, and at least one piezoresistive element attached to the housing and the diaphragm for sensing movement of the mass. In a particular embodiment, the accelerometer's housing comprises a frame, a base and a cap with air gaps providing squeeze film damping and mechanical stops for inhibiting movements of the mass.

The combination of the capability to electrostatically produce a movement of the mass and the piezoresistive sensing of that movement allows testing and calibration of the accelerometer at any stage in its manufacture or utilization without the need for external equipment such as shakers. This self-testing capability is particularly valuable at the wafer level of fabrication and during deployment in the field.

The foregoing and other objects, features, and advantages of the present invention will become clear to those skilled in the art from the following detailed description of the invention and the accompanying drawings.

BRIEF DESCRIPTION OF THE DRAWINGS

FIG. 4 is a graph showing electrostatic attraction vs. applied voltage with device sensitivity as a parameter to demonstrate the device insensitivity of the present invention.

FIG. 5 is a graph showing electrostatic attraction vs. applied voltage with temperature as a parameter to demonstrate the temperature insensitivity of the present invention.

DETAILED DESCRIPTION OF THE INVENTION

In its preferred embodiment, the present invention comprises a three layer silicon-silicon-silicon structure having a doubly-supported mass and frame sandwiched between a silicon cap and a silicon base. A simplified cross-sectional view is presented in FIG. 1.

Figure 1:
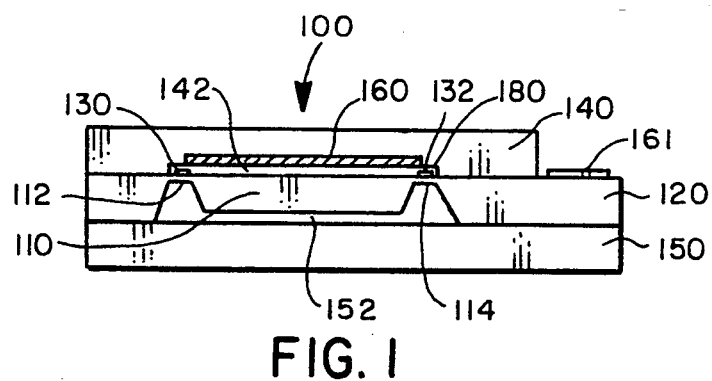
FIG. 1 is a cross-sectional view of one embodiment of an accelerometer according to the present invention.

FIG. 1 shows an accelerometer 100 comprising a silicon mass 110 suspended in a double support system including flexures 112 and 114 connected to a silicon frame 120. Frame 120 moves in response to external forces while mass 110 remains relatively still and thereby serves as the detector for the measurement of the forces. Flexures 112 and 114 include piezo-resistors 130 and 132 which detect and measure the relative movements of mass 110. Mass 110 is constructed in a way so as to be conducting, either itself being a conductor or having one or more conducting plates attached to it. Atop frame 120 is a silicon cap 140 having a cut-away portion or wall 142 to provide an air gap. Disposed along cut-away portion 142 on cap 140 is a deflection electrode 160 which, in conjunction with mass 110, produces a potential difference between deflection electrode 160 and mass 110. Below frame 120 is silicon base 150 which provides support to frame 120. Note that mass 110 is preferably shaped such that it does not touch base 150, leaving a second air gap 152 between frame 120 and base 150 when mass 110 is in an undeflected state. Bond pads, exemplified by pad 161, enable external electrical connection to accelerometer 100.

In normal operation of accelerometer 100, air gaps 142 and 152 allow mass 110 to move within accelerometer 100 and also provide squeeze film damping for mass 110 when it moves. Squeeze film damping is a phenomenon wherein air being squeezed between two large area plates resists the movement of the plates. The limited sizes of the air gaps allow cap 140 and base 150 to serve as mechanical stops to the motion of mass 110, thereby preventing excess movement of mass 110 which may destroy the device. In addition to controlling over- forces coming from any direction whose magnitude could be perhaps as much as hundreds of times greater than normal operating forces, squeeze film damping and mechanical stops also control resonance oscillations which are common in accelerometers. Resonance amplification factors in excess of 30,000 for silicon spring mass systems have been observed when there is no damping. However, because of substantial variations in viscosity with temperature, damping liquids have not been acceptable for many accelerometer environments. Thus, cap 140 and base 150 provide squeeze film damping using air and mechanical stops to control both over-force and resonance oscillations. Cap 140 and base 150 may be made of the same material as mass 110 and frame 120, so fabrication may be simplified and temperature dependent stress transduction is minimized. Cap 140 and base 150 also provide seals against undesirable particulate matter entering accelerometer 100 and jamming the motions of mass 110.

The present invention also insures that cap 140 and base 150 do not inadvertently impose an undesirable electrostatic force on mass 110. Both cap 140 and base 150 are usually electrically isolated from the sensing element. However, cap 140 and base 150 may each float to some arbitrary voltage due to extraneous electrical interactions caused by, for example, incident light, adjacent wiring, and even moisture. Base 150 is therefore preferably grounded. As seen in the embodiment of FIG. 1, since electrode 160 is preferably disposed between cap 140 and mass 110, it acts as an electrostatic field shield for mass 110 to shield it from the effects of any voltage on cap 140.

Figure 2:
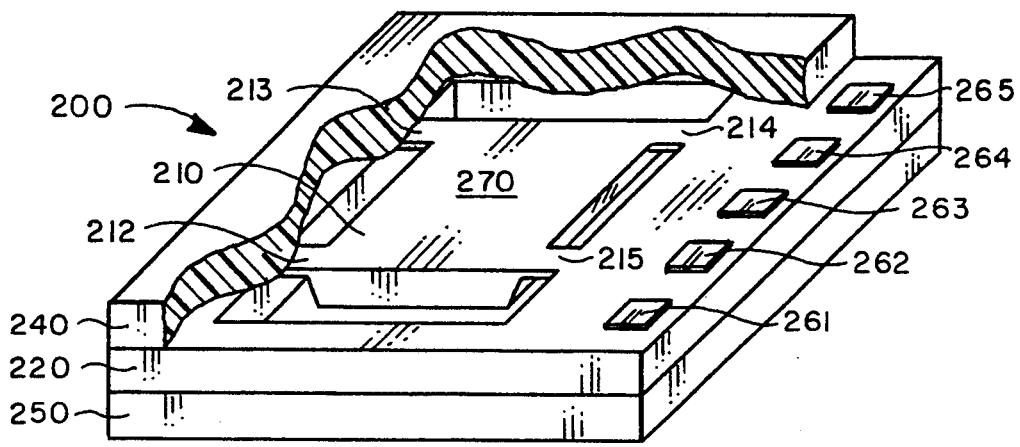
FIG. 2 is a partially cut away perspective internal view of one embodiment of an accelerometer according to the present invention.

FIG. 2 presents a perspective view of the preferred embodiment of the present invention. Accelerometer 200 is shown with cap 240 partially cut away to reveal the suspension of mass 210 on frame 220 which is disposed on base 250. In this embodiment, there are four support flexures 212, 213, 214, and 215 which have embedded piezoresistive elements to sense strain in the flexures. Bond pads, exemplified by pads 261-265, enable extended electrical connections to be made with these piezoresistive elements. Mass 210 and its flexure 212-215 comprise a diaphragm 270 which moves relative to frame 220 in response to applied accelerations.

Flexures 212-215 are disposed at the top surface of mass 210. The center of mass of mass 210 is somewhere near its middle below the surface thereof. This produces a movement of mass 210 when it is subjected to a cross-axis acceleration. Sensitivity of an accelerometer to this off-axis acceleration is in many cases undesirable. The electrical response to these off-axis movements can be significantly reduced by a connection of the piezoresistive elements in a Wheatstone Bridge as shown in FIG. 3.

Figure 3:
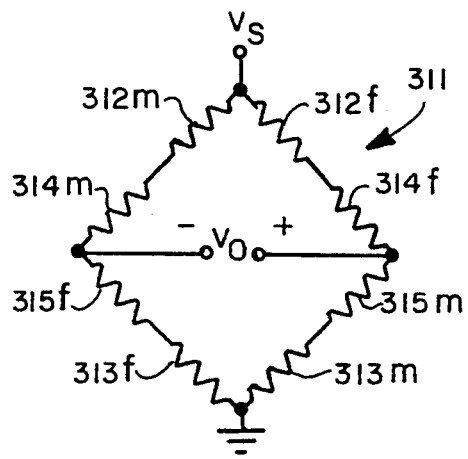
FIG. 3 is a schematic diagram showing the placement of piezoresistive elements in one embodiment of an accelerometer according to the present invention.

FIG. 3 is a schematic of an embodiment of the present invention having eight piezoresistors connected in a Wheatstone Bridge configuration 311 with two sensing resistors in each leg of the Bridge. Two resistors are in each flexure, one at the mass end of the flexure and one at the frame end of the flexure. In FIG. 3, "m" and "f" represents whether the piezoresistor is one positioned at the mass end or th frame end of the flexure, respectively. Thus 312m and 312f are sensor resistors on flexure 212 (of FIG. 2) which are proximate the mass and frame respectively. The other sensor resistor pairs, 313m/313f, 314m/314f, and 315m/315f are similarly attached to flexures 213, 214, and 215 of FIG 2. If the piezoresistive elements are well-matched and the movement of the mass is about its center of mass, then the equal and opposite responses from these piezoresistive elements make it theoretically possible to obtain output from the accelerometer for accelerations in the vertical (or principal axis) direction only. In practice, this implementation achieves a less than 1% response to off-axis accelerations and the elimination of observable off-axis resonances. For details of this theory, see H. Sandmaier, et al., "A silicon based micromechanical accelerometer with cross acceleration sensitivity compensation", Transducers '87 Digest of Technical Papers, June 1987, p. 399.

To simplify device fabrication and packaging, it is desirable to be able to enable electrical connection to electrode 160 via the same bond pads 261-265 used for enabling electrical connection to the Wheatstone Bridge piezoresistive elements 312-315. As best seen in FIG. 1, a metal conductor 180 is formed from the surface of cap 240 onto the top of frame 220 in a conventional manner such that electrical conduction is established between one of the bonding pads 161 and electrode 160. All the bonding pads then are on the top surface of frame 220. The air gap 132 between electrode 160 and the upper surface of mass 110 can also be tailored to better than 2% by controlling the depth of the etch of cap 240.

As an example of the size of this embodiment of the present invention, to achieve a desired sensitivity of a $\pm 1$ g in a full scale unit of 2 mV/V of Bridge drive, mass 110 is 3.6 mm square and accelerometer 100 is $7.7 \times 7.2 \times 1.2$ mm.

To achieve self-testability, one or more electrodes (for example, shown as 160 in FIG. 1) are disposed in cap 240. By applying a potential difference between the electrodes 160 and mass 110, electrostatic forces generated thereby can cause a deflection of mass 110. This system thus provides a primary test of accelerometer 100: if a potential difference is applied sufficient to produce a deflection and mass 110 moves in response to this controlled electrostatic force, then displacement can be detected by measurement of the change in output voltage of the Wheatstone Bridge 311, and thus the operational status of mass 110 is confirmed and accelerometer 100 shown to be operable. In addition, as to be described in detail below, accelerometer 100 may be calibrated and ratiometrically compensated.

The accelerometer's operation is based on fairly simple deflection equations. The sum of all forces acting on the mass 110 is zero:

$$0 = 9.8 \, mg - F_{electro} - k_s(x_o - x) \quad (1)$$

where: mg is the gravitational or acceleration force (acceleration in g), $k_s (x_O - x) = k_s \Delta x$ is the restoring force provided by the springs, and $F_{electro}$ is the electrostatic force:

$$F_{electro} = 0.5 \pi e A (V/x)^2 \quad (2)$$

where: V is the applied voltage between the electrodes,
A is the electrode area, and
e is the dielectric constant of the damping media.

If the electrostatic force is set equal to zero, then the displacement, $\Delta x$, is proportional to acceleration with the proportionality constant being $m/k_s$. Because the piezoresistors transduce stress in the springs and stress and strain are directly related by Young's Modulus, then the displacement can be derived by measuring the change in output voltage of the Wheatstone Bridge. If an electrostatic force is applied, equation (1) becomes non-linear:

$$0 = 9.8 \, mg - 0.5 \pi e A \frac{V^2}{(x_o - \Delta x)^2} - k_s \Delta x \quad (3)$$

For small deflections ($\Delta x/x_o < 5\%$), $\Delta x$ can be neglected compared with $x_o$. Typically, for a 50 g device with a 5 μm gap between mass and the electrode, the deflection is in the range of 3%. Note that for very sensitive devices (for instance, 5 g full-scale parts), the deflection can be made fairly large and therefore some adjustment of the electrostatic voltage compared to the full scale range needs to be made to optimize predictability of the response.

Applying a voltage V to the electrode corresponds to subjecting the mass to an acceleration of:

$$g_{electro} = \frac{\pi e A V^2}{19.6 \, m x_o^2}, \quad (4)$$

assuming small deflections. This force (mg) depends only on the applied voltage and the geometry, and is essentially independent of temperature and the sensitivity of the device, making it suitable for calibration purposes.

The present invention thus possesses the advantage of enabling acceleration measurements which do not significantly depend upon a particular device's sensitivity or ambient temperature variations. That is, although the flexures (as measured by spring constants) of the piezoresistive supports may vary from device to device (producing device sensitivity variations at least as high as 3 to 1) and the temperature environment may change by as much as 110° C., as long as the initial gap distance between a deflection electrode and the mass is held constant, a given applied electrostatic voltage will produce substantially the same electrostatic attraction. In a preferred embodiment of the present invention, the spring constant is relatively large, producing relatively small deflections for a given applied force. In other words, the deformable member of the present invention is relatively stiff. For example, for a 1.5 mm mass in a 300 μm thick silicon, the mass is 0.99 mg. In this example, the springs are 320 μm long by 70 μm wide by 7 μm thick. These dimensions yield a spring constant of 730 kg/m² and a peak strain in the supports of 160μ strains for 50 g. The deflection of the mass for a 50 g acceleration is approximately 0.7 μm. In the prior art there are closed-loop inertial type systems which allow deflection of the mass, but these typically levitate the mass in an electric or magnetic force field and thus require a relatively low spring constant for operation.

Based on the above equations, the expected curve for output force (g) versus applied electrostatic voltage (V) should be parabolic. FIG. 4 is a g aph of electrostatic attraction in units of g versus applied electode voltage in volts with sensitivity (S) as a parameter. As can be seen, variations in sensitivity of 0.79 to 2.18 mv/g all give approximately the same electrostatic acceleration values as a function of applied electrode voltage.

This means that the present invention is device insensitive over a large range of sensitivities resulting from the different characteristics of fabricating materials (such as the spring constants of the flexures). Consequently, accelerometers according to the present invention may be tested at the wafer level by exciting each device on the wafer with a step in the deflection voltage and measuring the sensitivity. This feature of the present invention greatly improves testing efficiency because accelerometers need not be individually mounted in a test gig before testing can be performed, as is necessary in the prior art.

FIG. 5 shows that electrostatic acceleration as a function of electrode voltage is also not significantly dependent upon operating temperatures, which, in this test, was varied from −25° C. to 100° C. (representing a change in piezoresistive sensitivity of approximately 25%). This shows that self-testing according to the present invention in situ where there may be extreme variations of temperature as, for instance, in geophysical applications, is a practical application.

As can be seen from the above, the self-testable accelerometer according to the present invention is highly desirable in that it allows automatic or manual calibration and recalibration of the accelerometer in situ. Where a computer recomputes the accelerometer sensitivity in a periodic fashion, the advantage is that the effects of long term changes in sensitivity are eliminated and the system can thus utilize sensors having temperature dependent sensitivities which do not approximate simple straight lines.

The present invention also provides a method of testing the damping characteristic over frequency. For example, in the diaphragm embodiment, the stiffness of the spring constant of the diaphragm, the squeeze film damping and the mechanical stops provided by the caps damp the movements of the mass on the diaphragm. If a potential difference is applied between the mass and the capacitive plate to produce movement of the mass at a predetermined frequency, then by measuring the degree of movement of the mass over time the damping characteristic may be determined. This procedure may be repeated at many different frequencies to determine the damping characteristic for each frequency. A feature of the present invention is that this type of testing may be done at the wafer level of fabrication, thereby providing a diagnostic test at an early stage to save time, effort, and cost.

For greater accuracy, the present invention may be ratiometrically sensitivity-compensated either manually or automatically by computer to produce a continuously corrected output. A preferred embodiment of a circuit 600 for this purpose is shown in FIG. 6.

Figure 6:
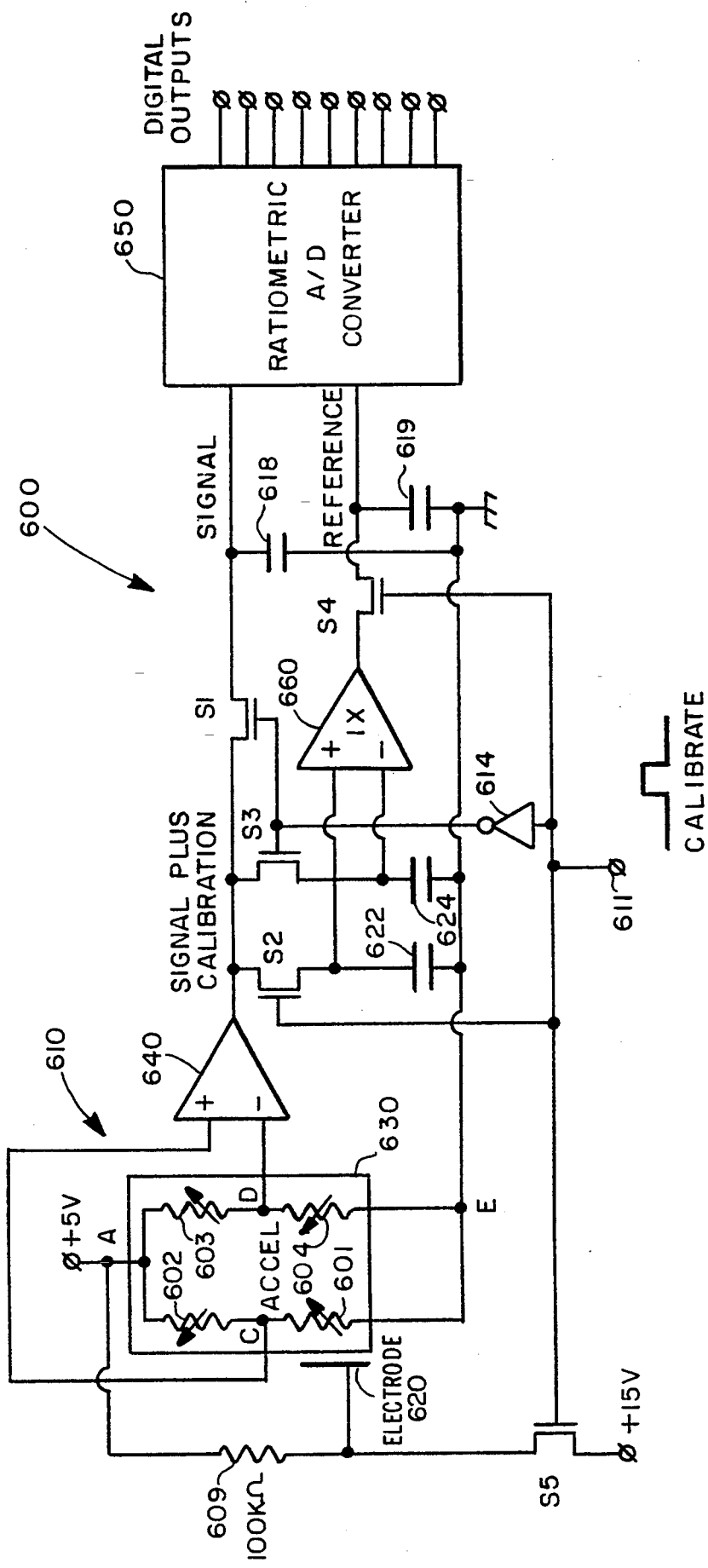
FIG. 6 is a schematic representation of one embodiment of a ratiometric compensation sub-system according to the present invention.

As shown in FIG. 6 a sensor 610 comprises four piezoresistive elements 611–614 in a Wheatstone Bridge configuration 630 mounted on a deflectable mass (not shown) and having a deflection electrode 620 adjacent thereto. Electrode 620 is connected in parallel with sensor 610 so that a potential difference may be established between electrode 620 and the mass. Nodes C and D of Wheatstone Bridge 630 are coupled to inputs of a differential amplifier 640. The output of amplifier 640 is coupled to a plurality of switches S1, S2, and S3. Although any conventional switch means can be used for the switching function according to the present invention, shown in FIG. 6 is an implementation using field effect transistors (FETs) as the preferred switches. These switches electronically couple the output signal from sensor 610 to one of three sample and hold devices, shown as capacitors 618, 622 and 624, respectively. Sample and hold devices 622 and 624 feed opposite inputs of a differential amplifier 660, whose output feeds a fourth sample and hold device, shown as capacitor 619, through a fourth switch S4. The output of sample and hold device 619 feeds the reference input of ratiometric A/D converter 650 and the output of sample and hold device 618 feeds the signal input of A/D converter 650. A switch S5 controls the generation of an electrostatic force by electrode 620.

As is seen in FIG. 6, a calibrate signal preferably generated by a computer or other accelerometer processor, or the like, generates a pulse which closes switches S2, S4 and S5 and opens switches S1 and S3. In operation, with the calibrate signal being generated, switch S5 acts to cause the sensor output to be a multiplexed combination of the normal accelerometer sensor output and the signal change resulting from the electrostatic force generated by electrode 620. This multiplexed signal is amplified by amplifier 640 and fed to sample and hold device 622.

Amplifier 660 acts to extract the calibration signal on a real time basis from the signal output by amplifier 640 in the following manner. When the calibrate signal is removed, switch S2 is opened and switches S3 and S1 are closed. Since S5 is now also open, the signal output from amplifier 640 is the normal sensor signal without the addition of the calibrate signal. This signal is fed through switch S1 to sample and hold device 618 for feeding to the A/D converter 650 as the normal signal from the accelerometer. The normal signal is also fed through switch S3 to the other sample and hold device 624 feeding amplifier 660. Thus, at this point, the one input to amplifier 660 from sample and hold device 622 is the normal sensor signal plus the calibration signal whereas the other input to amplifier 660 is the signal without the calibration signal. Since amplifier 660 is a differential amplifier, the output thereof is thus the difference between the two signals retained on sample and hold devices 622 and 624 respectively, and thus constitutes the calibration signal demultiplexed from the normal accelerometer signal. During the next appearance of a calibrate signal, with switch S4 closed, the output of amplifier 660 is fed to sample and hold device 619 for input as the reference signal to the A/D converter 650.

Thus, the signal output on the digital output lines of A/D converter 650 is normalized to the electrostatic force applied to sensor 610 and is independent of temperature and other drift terms. By using this ratiometric capability in an A/D converter 650, an analog division of the signal to the reference is achieved. Thus, a division of the signal output to the calibration output is obtained. As the calibration signal changes due to temperature, aging, or the like, the signal will change by the same factor. The ratiometric division will then normalize the sensor's output based on the calibration. If an analog output were desired from the ratiometric self-testable circuit 600, one would merely add a digital to analog (D/A) converter on the output of A/D converter 650. Note that the sample and hold approach used in circuit 600 may be simplified in a manner conventional in the art.

Figure 7:
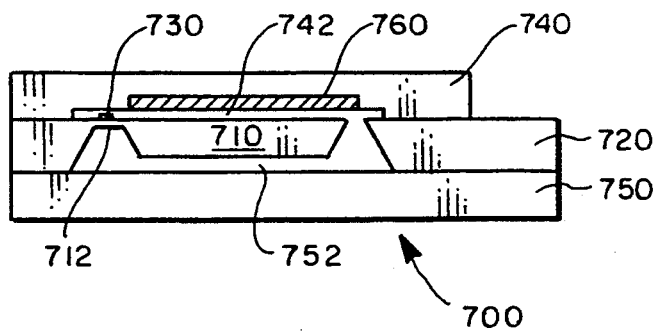
FIG. 7 is cross-sectional view of a single beam accelerometer according to the present invention.

Another embodiment of the present invention is a single beam (also referred to as a single cantilever) accelerometer 700 as shown in cross-section in FIG. 7. A mass 710 is attached by support flexure 712 to a frame 720 and at least one piezoresistive element is attached to flexure 712 to sense movements of mass 710. A cap 740 overlies mass 710 and frame 720 with a deflection electrode 760 disposed opposite mass 710. As in the diaphragm accelerometer of FIG. 1, air gaps 742 and 752 are preferably formed about mass 710 to provide squeeze film damping of movements of mass 710. Cap 740 and base 750 are further designed to provide appropriate mechanical stops for the motion of mass 710.

In operation, accelerometer 700 may be tested and calibrated at the wafer level and in situ having all the features and advantages of the diaphragm accelerometer of FIG. 1. However, when subjected to an acceleration, the tip of mass 710 will tend to deflect upwards, and since there is no Wheatstone Bridge balancing of piezoresistance in a single beam device, there will be no off-axis cancellation. This off-axis acceleration can be reduced somewhat by mounting the die during fabrication such that the center of flexure 712 and the center of mass 710 are co-planar. Typically, the mounting angle is 3° to 8° from flat.

Another embodiment of the present invention comprises a plurality of electrodes disposed so as to pull the mass towards one corner, along a side, or towards any direction by a combination of electrostatic forces generated by the plurality of electrodes. Any combination of electrostatic forces generated by configurations of electrodes is deemed to be within the scope of the present invention. A particular example is a placement of an electrode on the base (150 in FIG. 1) of the accelerometer below the mass so that an electrostatic force thereby generated would operate in conjunction with an electrode on the cap to produce a push-pull action of the mass. This would be useful, for example, in applications having larger displacements of the mass to achieve increased accuracy of measurement. As seen from Equation (3), large values of x causes the relationship to be non-linear. By using opposing electrodes, first to measure the upward sensitivity and then the downward sensitivity, increased accuracy is achieved by taking the geometric mean of the upward and downward sensitivities. Equation (4) for the acceleration then becomes:

$$g_{electo} \approx \sqrt{\left[\frac{\pi e A V^2}{19.6\,m} \cdot \frac{1}{(x_o - \Delta x)^2}\right] \cdot \left(\frac{\pi e A V^2}{19.6\,m} \cdot \frac{1}{(x_o - \Delta x)^2}\right)} = \frac{\pi e A V^2}{19.6\,m x_o^2} \cdot \frac{1}{1 - (x/x_o)^2} \quad (5)$$

As can be seen in Equation (5), the linear error factor is significantly reduced. For example, for a deflection of the mass by as much as 20% of the gap (that is, $\Delta x/x_o = 0.2$), a measurement utilizing a one-sided pull produces an error of 56% whereas the two-sided push-pull results in an error of only 4%.

Another embodiment of the present invention is an angular accelerometer structure wherein a non-uniform electrostatic force is utilized to pull up on one side of the mass and not the other side thereby producing an angular motion of the mass. This would be useful in angular acceleration applications because the electrostatic force can be made constant and thus simulate a constant angular acceleration without having to spin the device.

The above description of the present invention has been made with reference to self-testable diaphragm and single beam accelerometers. It will be apparent to those skilled in the art that the present invention is applicable to other configurations of sensors such as multiple beam pendulum accelerometers utilizing resistive elements attached in flexures and electrodes to deflect the beams for measurement, testing, and calibration purposes.

The above description of the present invention was directed towards piezoresistive sensing of deformable member motion. It will be apparent to those skilled in the art that the present invention encompasses other means of sensing this motion, as for example, magnetic field sensing.

Accordingly, various modifications to the present invention will be apparent from the above description and accompanying drawings and the present invention is to be limited solely by the scope of the following claims.

What is claimed is:

1. A method of testing the temperature insensitivity of an accelerometer having a housing, a deformable member formed in said housing movable relative to said housing in response to an applied force, said deformable member including a conductive mass formed thereon, at least one capacitive plate attached to said housing and disposed such that a potential difference between said capacitive plate and said mass causes a movement of said mass, means for producing a potential difference between said mass and said capacitive plate, and at least one piezoresistive element attached to said housing and said deformable member for sensing movement of said mass, comprising the steps of:

subjecting said accelerometer to a plurality of different temperatures over a substantial range of temperature, maintaining a predetermined initial distance between said capacitive plate and said mass, and applying a predetermined potential difference between said capacitive plate and said mass producing substantially the same electrostatic acceleration between said capacitive plate and said mass for each of said plurality of temperatures.

2. A method of testing the damping characteristic over frequency of an accelerometer having a housing, a deformable member formed in said housing movable relative to said housing in response to an applied force, said deformable member including a conductive mass formed thereon, at least one capacitive plate attached to said housing and disposed such that a potential difference between said capacitive plate and said mass causes a movement of said mass, means for producing a potential difference between said mass and said capacitive plate, at least one piezoresistive element attached to said housing and said deformable member for sensing movement of said mass, and a frame for supporting said deformable member and said mass, a base supporting said frame underlying said deformable member and having a first air gap therebetween, a cap overlying said deformable member and having a second air gap therebetween, and said first and second air gaps providing squeeze film damping for movements of said mass, and further being sized so that said base and said cap provide mechanical stops for movements of said mass, comprising the steps of:

applying a potential difference between said mass and said capacitive plate to produce movement of said mass at a predetermined frequency; and measuring the degree of movement of said mass over time.

3. A method of testing the frequency response of an accelerometer having a housing, a deformable member formed in said housing movable relative to said housing in response to an applied force, said deformable member including a conductive mass formed thereon, at least one capacitive plate attached to said housing and disposed such that a potential difference between said capacitive plate and said mass causes a movement of said mass, means for producing a potential difference between said mass and said capacitive plate, at least one piezoresistive element attached to said housing and said deformable member for sensing movement of said mass, the housing comprising a frame for supporting said deformable member and said mass, a base supporting said frame underlying said deformable member and said mass, a base supporting said frame underlying said deformable member and having a first air gap therebetween, and a cap overlying said deformable member and having a second air gap therebetween, wherein said first and second air gaps provide squeeze film damping for movements of said mass, and further being sized so that said base and said cap provide mechanical stops for movements of said mass, comprising the steps of:

applying a potential difference between said mass and said capacitive plate to produce movement of said mass at a predetermined frequency; and measuring the degree of movement of said mass over time.

4. A method of testing frequency response in accordance with claim 3 wherein said applying step applies a potential difference signal to produce movement of said mass over a predetermined range of frequencies.

5. A method of testing frequency response in accordance with claim 4 wherein said applying step causes the movement of said mass to sweep in frequency over said predetermined range of frequencies.

6. A method of testing frequency response in accordance with claim 5 wherein said measuring step measures the degree of movement of said mass over said sweep of frequencies.

7. A method of testing frequency response in accordance with claim 4 wherein said measuring step measures the degree of movement of said mass over said range of frequencies.

8. A method for determining the operability of an accelerometer having a housing, a deformable member formed in said housing movable relative to said housing in response to an applied force, said deformable member including a conductive mass suspended by flexures formed in said housing, means for electrostatically moving said mass with respect to said housing, and means for sensing a movement of said mass, the method comprising the steps of:

(a) applying an operability testing potential difference between said mass and said housing, thereby electrostatically moving said mass with respect to said housing; and (b) sensing the movement of said mass.

9. A method for determining the operability of an accelerometer having a housing, a diaphragm in said housing movable relative to said housing in response to an applied force, said diaphragm including a conductive mass suspended by flexures, means for electrostatically moving said mass with respect to said housing, and means for sensing a movement of said mass, the method comprising the steps of:

(a) applying an operability testing potential difference between said mass and said housing, thereby electrostatically moving said mass with respect to said housing; and (b) sensing the movement of said mass.

10. A method for determining the operability of an accelerometer having a housing, a conductive mass suspended in said housing movable relative to said housing in response to an applied force, said conductive mass being suspended with flexures, means for electrostatically moving said mass with respect to said housing, and means for sensing a movement of said mass, the method comprising the steps of:

(a) applying an operability testing potential difference between said mass and said housing, thereby electrostatically moving said mass with respect to said housing; and (b) sensing the movement of said mass.

* * * * *